July 26, 1938.   I. J. RICHARDS   2,124,632
MOWING MACHINE
Filed Dec. 9, 1936
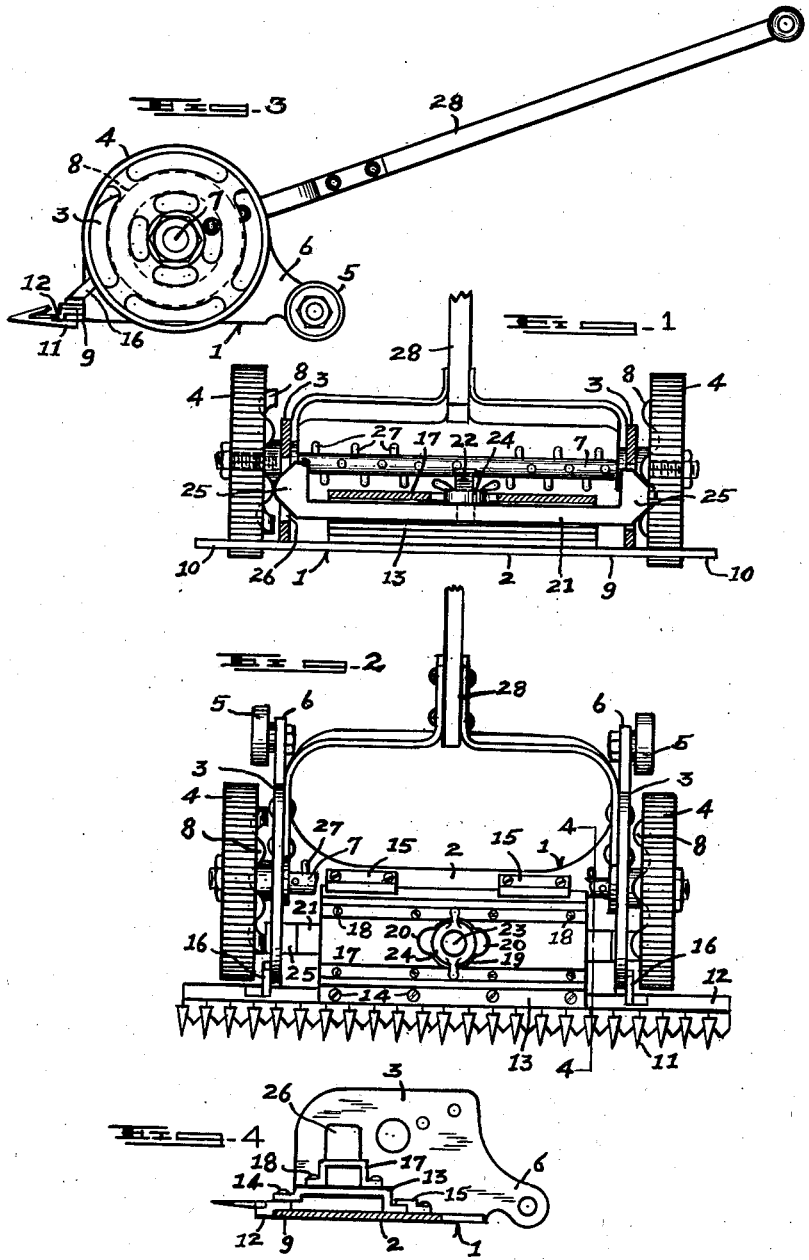
INVENTOR
Idris J. Richards
By Jas R Snyder
Attorney Patented July 26, 1938

2,124,632

UNITED STATES PATENT OFFICE 2,124,632

MOWING MACHINE

Idris J. Richards, Pittsburgh, Pa.

Application December 9, 1936, Serial No. 114,898

1 Claim. (Cl. 56—262)

This invention relates to a mowing machine, and while herein illustrated and described as embodied in a lawn mower, it will be obvious that the invention may be embodied in a power operated mowing apparatus, or in any other type of grass mowing mechanism wherein it is found to be applicable.

Important objects and advantages of the invention are to provide a mowing machine of the character described, which may be successfully constructed and operated to cut an exceptionally wide swath of grass, which will facilitate the cutting of grass at the edges of side walks, under hedges and other plants, or near any other kind of obstructions, which is simple in its construction and arrangement being gearless and embodying relatively few parts, and which is comparatively inexpensive to manufacture.

To the accomplishment of these and such other objects as may hereinafter appear, the invention consists of the novel construction, combination and arrangement of parts herein specifically described and illustrated in the accompanying drawing, but it is to be understood that changes in the form, proportions and details of construction may be resorted to that come within the scope of the claim hereunto appended.

In the drawing wherein like numerals of reference designate corresponding parts throughout the several views:

Figure 1 is a front view of a lawn mower embodying the present invention and being partly in section and with the cutter elements removed.

Figures 2 and 3 are, respectively, top plan and side views of the device.

Figure 4 is a sectional view of the frame and of associated parts taken on line 4—4, Figure 2.

Referring in detail to the drawing 1 denotes an integral, substantially U-shaped frame, comprising a horizontally disposed bottom 2, and a pair of vertically extending side members 3.

The frame 1 is supported by a pair of comparatively large traction wheels 4 and a pair of relatively small trailer wheels 5. The trailer wheels are revolubly connected to the rear end of the extensions 6 of the frame side members 3 and support the rear end of the mower.

A horizontally disposed shaft 7 extends through the frame 1 and is spaced from the frame bottom 2. The shaft is suitably journaled for rotation in the frame side members 3 and carries the traction wheels 4, which are fixed, in any suitable manner, to respective ends of said shaft, outwardly of the frame side members.

Each of the traction wheels 4 is provided with a cylindrical cam 8, which extends laterally inward therefrom. The cylindrical cams are preferably formed integral with the inner side of the traction wheels and are disposed equi-distant from the axis and spaced from the peripheries of respective traction wheels.

The traction wheels 4 are so adjusted on respective ends of the shaft 7 that the undulations of the cylindrical cams 8 are disposed in staggered relation with respect to each other. In other words, the projections on the inner working face of one of the cylindrical cams are horizontally aligned with the depressions on the inner working face of the other of said cylindrical cams. As the traction wheels are fixed in position on the shaft, the staggered relation of the cylindrical cams, in the manner set forth, is permanently maintained.

The front portion 9, of the frame bottom 2, projects forwardly of the traction wheels 4, and includes lateral extensions 10 disposed on respective sides thereof and extending beyond the traction wheels, as clearly illustrated in Figure 1.

A cutter bar 11, of the usual construction embodying a plurality of regularly spaced slotted fingers, is fixed in the horizontal position to the frame front portion 9. A cutter member 12, of the well known construction, is mounted for lateral reciprocal movement on the frame front portion 9 and includes the triangular cutters, which extend into the slotted fingers of the cutter bar in the usual manner well known in the art.

A base plate 13 is mounted for lateral reciprocal movement on the frame bottom 2, and has a depressed forward edge margin detachably secured, by means of screws 14, to the cutter member 12. The rear edge margin of the base plate is depressed and shiftably engaged by a pair of guide plates 15, which are secured to the frame bottom 2. A pair of cutter guides 16 is fixed to respective frame side members 3 and engage the top of the cutter member 12 for maintaining the latter in position relatively to the cutter bar 11, while allowing the lateral reciprocal movement of the cutter member. By removing the screws 14 to release the base plate 13 from the cutter member 12, the latter may be removed from the cutter bar for sharpening, repairs, or for any other purposes required.

A channel bar guide 17 is detachably secured to the top of the base plate 13 by means of screws 18. The top of the bar guide 17 is provided with a centrally disposed, comparatively large aperture 19 and a pair of laterally aligned slots 20 which open into said aperture 19 at respective sides of the latter.

A cam bar 21 is mounted and slidably engaged in the bar guide 17. The cam bar carries a fixed, vertically extending bolt 22, which is provided with a head 23 and projects upwardly through the bar guide aperture 19. A wing nut 24 is engaged on the bolt 22, and the diameter thereof is slightly less than the diameter of the guide aperture 19 so that said wing nut may enter the latter for the purpose to be described.

Each end of the cam bar 21 is formed to provide a cam head 25, which projects through openings 26 in respective frame side members 3 and engage the inner working faces of the cylindrical cams 8, carried at the inner side of respective traction wheels 4. The rotation of the traction wheels will impart a lateral reciprocal movement to the cam bar 21. The frequency of such reciprocal movements is, of course, determined by the number of undulations on the cylindrical cams 8, and is such as to efficiently effect grass cutting operations.

A suitable handle 28 is secured to the frame 1 and provided to facilitate the pushing of the mower forwardly during grass cutting operations, in the manner identical to that employed in connection with a lawn mower of the type now in common use.

When the nut 24 is adjusted on the bolt 22 to seat on the cam bar 21 through the aperture 19, the cam bar cannot reciprocate idly in the bar guide 17, but the latter is engaged by said nut, whereby the lateral reciprocal movement of the cam bar imparts like movement to the cam bar, base plate 13, and cutter member 12 to effect grass cutting operations. However, when the nut 24 is released on the bolt 22 to the distance permitted by the bolt head 23, it will clear the top of the bar guide 17, and allow the idle reciprocation of the cam bar in the bar guide. The slots 20 in the bar guide provide clearance for the travel of the bolt 22 during such idle movement of the cam bar. By this arrangement the operation of the cutter member 12 may be suspended while the mower is being transported from place to place on its traction wheels 4. The provision of the bolt head 23 prevents the removal and possible loss of the nut 24 and is a definite stop for the latter when in the released position.

The shaft 7 is preferably provided with a plurality of fixed, radially disposed fingers 27, which function to direct and impel the cut grass rearwardly through the frame structure of the mower during the grass cutting operations.

The present invention provides a most efficient device of its kind, which is conveniently operable, and which is particularly effective for cutting grass close to the edges of side walks and the like, under and around hedges, plants, or other obstructions.

What I claim is:

In a grass mowing machine of the character described, the combination of a frame including a bottom and a projecting front portion, a horizontally disposed shaft revolubly mounted in said frame, a pair of traction wheels fixed to respective ends of said shaft, a cylindrical cam carried at the inner side of each of said wheels, a cutter bar fixed in the horizontal position to said front portion of the frame, a cutter member mounted for lateral reciprocal movement on said front portion and extending into said cutter bar, a base plate mounted for lateral reciprocal movement on the frame bottom and being secured to said cutter member, a horizontally disposed channel guide secured to the top of said base plate and having a slotted opening in the top thereof, a cam bar longitudinally shiftable in said guide, each end of said bar having a cam head engaging in respective cylindrical cams for imparting lateral reciprocal movement to said bar during the rotation of the cylindrical cams, a vertically extending bolt fixed to said cam bar and projecting through said slotted opening in said guide, and a nut adjustably mounted on said bolt.

IDRIS J. RICHARDS.